United States Patent Office 2,812,962
Patented Nov. 12, 1957

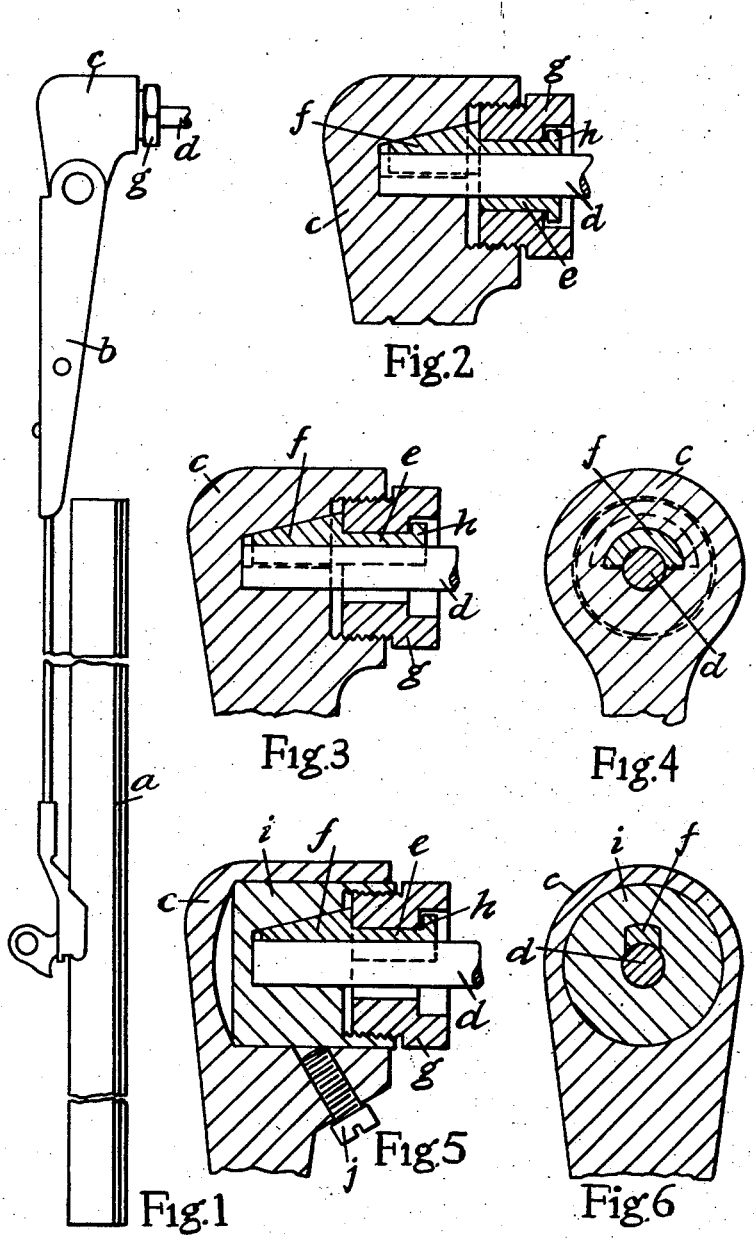

2,812,962
SPINDLE COUPLINGS

Eric B. Parkes, Birmingham, England, assignor to Joseph Lucas (Industries) Limited, Birmingham, England Application May 20, 1954, Serial No. 431,159

1 Claim. (Cl. 287—53)

This invention relates to a coupling for securing to an angularly movable spindle a part to be actuated by the spindle, and particularly to a coupling for attaching a vehicle windscreen wiper arm to its actuating spindle.

A coupling in accordance with the invention comprises the combination of a part adapted to receive one end of the spindle to be secured thereto and having therein a tapered groove, a wedge in contact with the spindle and entering the said groove, and a rotatable bush in screw thread connection with the said part for tightening the wedge.

In the accompanying drawings:

Figure 1 is a side elevation illustrating one form of a vehicle windscreen wiper to which the invention is applicable.

Figure 2 is a sectional side elevation illustrating one form of means embodying the invention for securing the actuating spindle to the wiper.

Figures 3 and 4 are respectively a sectional side elevation and a cross section illustrating a modification of the construction shown in Figure 2.

Figure 5 and 6 are respectively similar views to Figures 3 and 4 illustrating a further modification.

Referring to Figure 1, this represents a wiper comprising a blade $a$, and arm $b$ to which the blade is pivotally attached, a boss $c$ to which the arm is pivotally attached, and an actuating spindle $d$ secured to the boss. One application of the present invention relates to a means for securing the spindle to the boss.

Referring to Figure 2 the boss $c$ has formed therein an axial bore for reception of one end of the actuating spindle $d$, the bore being closed at its outer end. Also at the other end of the bore in the boss is formed an internally screw-threaded enlargement of the bore. In one side of the part of the bore which receives the spindle is formed a tapered groove of segmental form which subtends about 180° of the bore.

For effecting connection of the boss to the spindle there is preferably provided a hollow cylindrical sleeve $e$ having an internal diameter substantially equal to the diameter of the spindle. From one end of the said sleeve extends an integral wedge $f$ of semicircular channel form in cross section and corresponding in shape to the groove in the boss.

On the said sleeve is mounted an externally screw-threaded bush $g$ for engagement with the screw thread in the boss, the bush being adapted at one end to abut against the larger end of the wedge. After the bush has been placed over the sleeve, the end of the latter remote from the wedge is subjected to an expanding operation for the production thereon of a narrow flange $h$. Preferably the bush has formed in its outer end a recess to accommodate the said flange.

The arrangement is such that when the parts have been placed together, rotation of the bush forces the wedge into the groove in the boss and so sets up a binding action between the opposite side of the spindle and the adjacent surface of the bore in the boss. Retraction of the wedge for releasing the boss is effected by reverse rotation of the bush, causing the latter to exert endwise pressure on the aforesaid flange.

In the modified construction shown in Figures 3 and 4, the sleeve $e$ is made of segmental section so that it subtends only one half of the circumference of the spindle, and occupies one half of the bore of the bush.

In the further modification shown in Figures 5 and 6, the boss has formed in it a cylindrical bore which is closed at one end, and in this bore is inserted a hollow cylindrical plug $i$ which is secured by a set-screw $j$. In the plug $i$ is formed a tapered groove of relatively narrow width and having flat sides. Also the wedge $f$ is of corresponding shape. In other respects this modification may be similar to either of the forms shown in Figures 2 and 3. If desired the constructions shown in Figures 2 and 3 may be provided with a detachable plug for carrying the spindle-securing means as shonw in Figures 5 and 6.

By this invention the detachable connection of a windscreen wiper arm to its actuating spindle can be effected in a very simple and convenient manner. The invention is not, however, restricted to the particular purpose above described as it may be applied to couplings for other analogous purposes, such as for example the interconnection of the adjacent ends of two coaxial spindles, or the attachment to a spindle of a gear wheel or other mechanical component required to be secured to the spindle.

Having thus described my invention what I claim as new and desire to secure by Letters Patent is:

A spindle coupling comprising in combination a first member formed with a blind hole for accomodating one end of the spindle, a second member through the medium of which the first member is securable to the spindle by a wedging action, and a third member by which the second member is slidable relatively to the first member for tightening the first member on and releasing it from the spindle, the first member having formed therein at one side of the said hole a longitudinally tapered groove of arcuate cross section, the second member consisting in part of a wedge which is shaped to correspond with and extends into the said groove, and the third member having the form a a bush freely rotatable on the second member and in direct screw thread engagement with the first member.

References Cited in the file of this patent
UNITED STATES PATENTS

| 210,618 | Melvin | Dec. 10, 1878 |
| 269,608 | Wain | Dec. 26, 1882 |
| 287,809 | Devereux | Nov. 6, 1883 |
| 350,860 | Baldwin | Oct. 12, 1886 |
| 420,010 | Hain | Jan. 21, 1890 |
| 688,687 | Printz | Dec. 10, 1901 |
| 1,103,403 | Duckworth | July 14, 1914 |
| 1,412,235 | Felix | Apr. 11, 1922 |
| 2,596,197 | Bayes | May 13, 1952 |
| 2,719,047 | Bayes et al. | Sept. 27, 1955 |

FOREIGN PATENTS

| 488,043 | Canada | Nov. 11, 1952 |